(No Model.) 2 Sheets—Sheet 1.
W. J. BREWER.
CONDUIT FOR CABLE OR ELECTRIC RAILWAYS.
No. 405,767. Patented June 25, 1889.
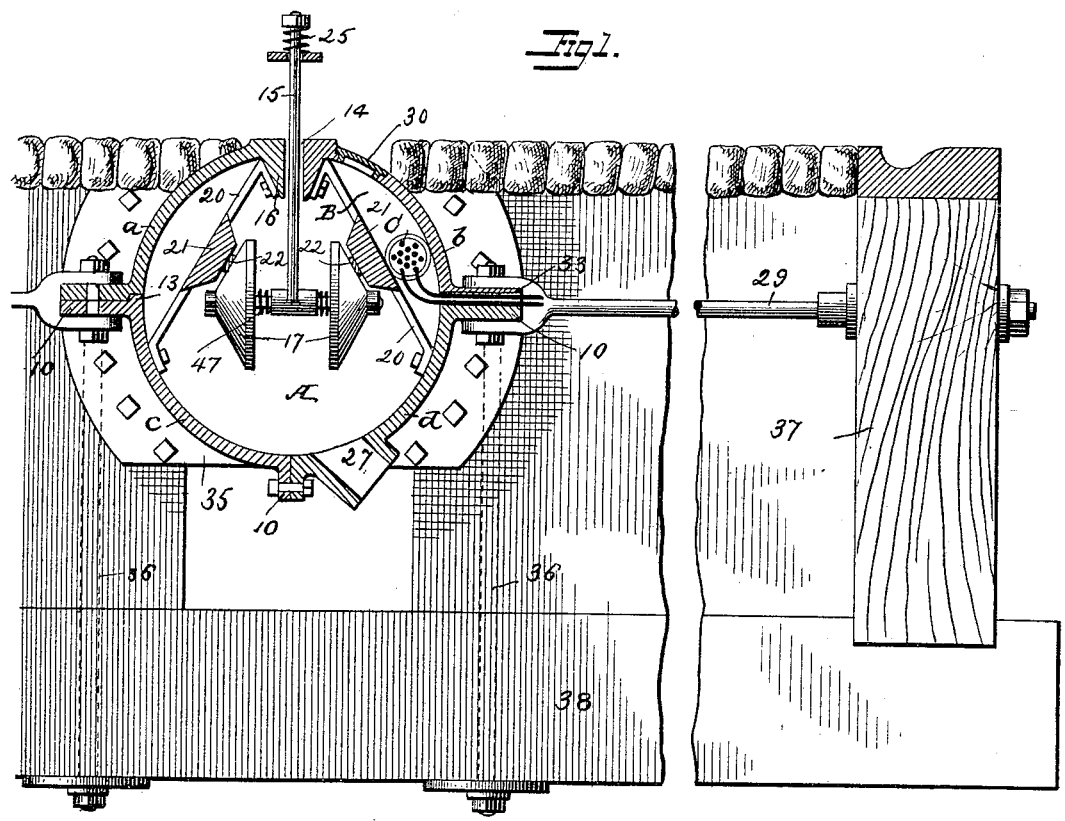
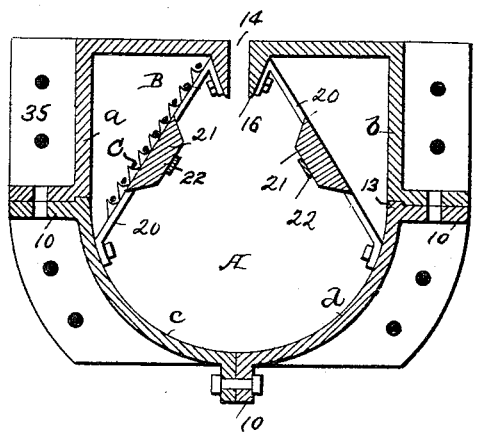
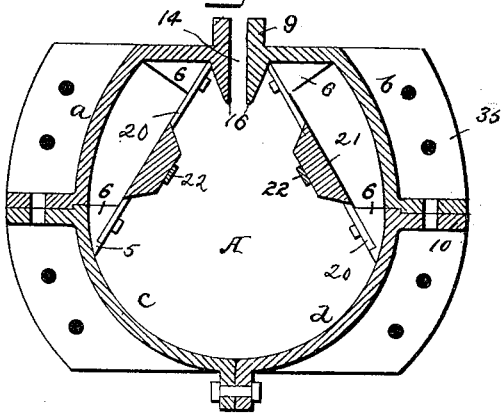
Witnesses
Inventor (No Model.) 2 Sheets—Sheet 2.
W. J. BREWER.
CONDUIT FOR CABLE OR ELECTRIC RAILWAYS.
No. 405,767. Patented June 25, 1889.
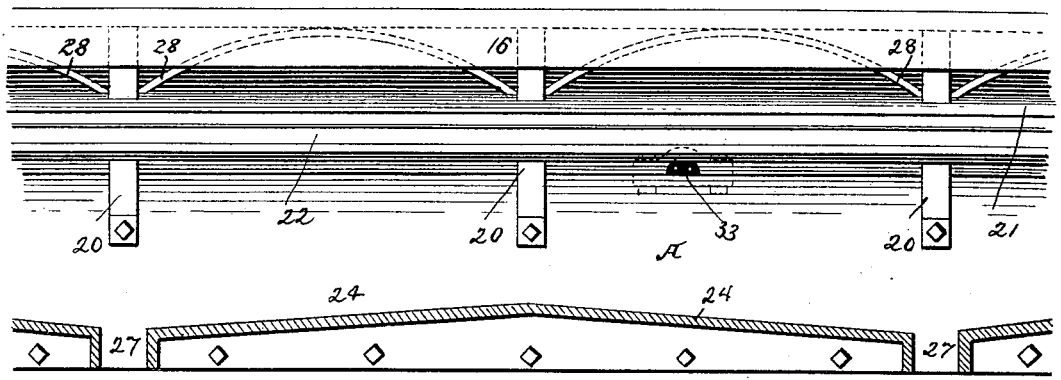
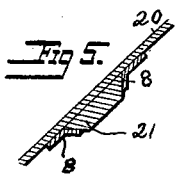
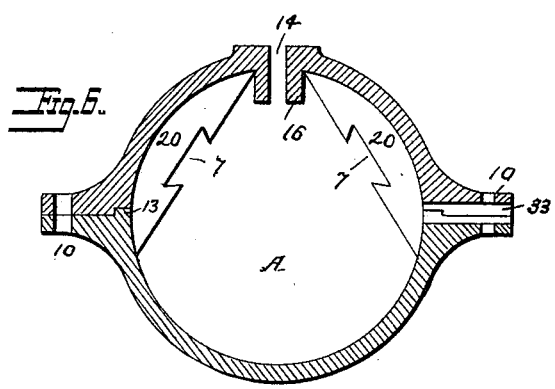

UNITED STATES PATENT OFFICE.

WILLIAM JOHN BREWER, OF NEW YORK, N. Y., ASSIGNOR OF THREE-FIFTHS TO THOMAS W. RAE, FREDERICK H. REED, WALTER THOMPSON, AND GEORGE N. MCKIBBIN, ALL OF SAME PLACE.

CONDUIT FOR CABLE OR ELECTRIC RAILWAYS.

SPECIFICATION forming part of Letters Patent No. 405,767, dated June 25, 1889.

Application filed August 7, 1888. Serial No. 282,163. (No model.)

*To all whom it may concern:*

Be it known that I, WILLIAM JOHN BREWER, a subject of the Queen of Great Britain, having declared my intention to become a citizen of the United States, residing in the city, county, and State of New York, have invented certain new and useful Improvements in Conduits for Cable or Electric Railways, of which the following is a specification.

The present invention relates particularly to the construction of underground conduits for cable or electric railways, and also adapted for containing telegraph, electric-light, or other wires, said conduit having means by which such wires may be led from the conduit for connection with other wires or circuits.

In the accompanying drawings, Figure 1 is a transverse section of a conduit constructed according to my invention. Fig. 2 is a central longitudinal section of the same. Figs. 3, 4, and 6 are transverse sections illustrating modified forms of the conduit. Fig. 5 is a detail of the manner of securing the insulating-strip to one of the transverse braces.

The conduit A in the preferred construction consists of four quarter-sections $a$, $b$, $c$, and $d$, having lateral flanges 10, extending longitudinally of the conduit, through which by bolts the two upper sections $a$ and $b$ are secured, respectively, to the two lower sections $c$ and $d$, and the two latter sections secured together, as seen in Fig. 1. At the meeting-points of the sections $a\,c$ and $b\,d$ suitable longitudinal ribs 13 may be provided, adapted to enter like recesses in the opposite sections. The two upper sections $a\,b$, which form the crown to the conduit, are separated a suitable distance apart to form the central longitudinal slot 14 for the passage, in the case of a cable railway, of the grip-carrying bar, and in the case of an electric railway of the trolley-carrying bar 15. The longitudinal edges of these sections forming the slot are formed with depending ribs 16, materially strengthening the sections along their upper portions, but more especially forming an effective guard to the underlying electric conductors to direct all the water that may enter the conduit through the slot to its center and prevent it from coming in contact with either the conductors or with the bearing-faces of the contact wheels or rolls 17. The importance of this provision for the protection of the conductors and contact-wheels from water of course will be readily appreciated by those familiar with the electrical science.

The conduit in cross-section is preferably of circular or nearly circular form, as shown in Fig. 1, in which case each section $a$, $b$, $c$, and $d$ would correspond to a quadrant of a circle, or nearly so. It is obvious, however, that instead of forming the lower sections $c$ $d$ of two independent quadrants they might be formed in one piece; but for the purposes of ready removal, if any portion of the conduit be imperfect or injured, I prefer to form them in separate sections, as the two upper ones are. The form of the conduit in cross-section, however, may be varied without departing from my invention. As shown in Fig. 3, the upper sections may be angular in form, while the lower sections are curved. In Fig. 4 the tops of the upper sections are flat, the remaining portions being curved, and the top of the sections adjacent to the slot may be provided with vertical flanges 9, extending longitudinally of the conduit, forming abutments for the blocks or cobbles forming the surface of the road-bed, as is well understood.

The conduit A, longitudinally considered, may be formed in longitudinal sections of any desired length, and these longitudinal sections may be secured together by bolts passing through their meeting flanges 35 in the same manner as are the sections $a\,b\,c\,d$.

In order to materially strengthen the conduit and to prevent the caving in of the upper sections by reason of the great strain to which they are subjected by the passage of heavy vehicles, there is provided at suitable points along its length diagonal transverse braces 20, that extend from a point close to the slot or inner upper end of each of the upper sections diagonally downward to the adjoining lower sections, preferably some distance below the points of juncture of the sections, the said braces being suitably secured at each end to the sections by means of bolts, as shown. Instead of securing the ends of these braces directly to the sides of the sections, it is obvious they may be provided with inwardly-extending flanges 6, Fig. 4, one or both having a shoulder 5, against which the end of the brace may be seated, and be secured in place by bolts, as shown. So, too, the braces might be formed integral with the upper section, as shown in Fig. 6, in which case the brace may extend diagonally to the joint between the upper and lower sections, or, as shown, may extend below the joint to bear against the interior surface of the lower joint. In the case of electric railways these transverse braces form a convenient means of support for the electric conductors. For this purpose there is provided a strip or bar 21, of suitable insulating material, that is extended longitudinally through the conduits and along and in contact with the braces 20, by which it may be supported in any desirable manner. As shown in Fig. 5, the brace 20 is provided with flanges 8, partially embracing the longitudinal insulator-strip 21, and the latter, by reason of its inclined sides, is held easily to the brace, so that it may have free longitudinal motion on its supports. Where the brace is formed as in Fig. 6, a recess 7 may be provided therein to receive and hold the insulator-strip, the latter being free to move longitudinally therein. The electric conductor 22, in the form of a flattened strip, is secured to the outer or exposed side of the insulator-strip and extends longitudinally thereof through the conduit, any suitable fastening means being employed to secure it in place. The angle at which the transverse braces 20 bear with relation to the vertical axis of the conduit obviously might be varied within wide limits, keeping in view the desirability of properly strengthening the upper sections and the necessity of supporting the electric conductor as far removed from directly below the slot 14 as is possible. By thus supporting the conductors their contact-faces are so inclined that no foreign substances can accumulate thereon to break the electrical contact of the wheels 17 therewith. To accommodate this angular position of the conductors the bearing-faces of the contact-wheels will be similarly inclined, as shown, and in order to insure this contact in addition to a spring 25, the tendency of which is to raise the carrying-bar 15 and trolley, I prefer to employ springs 47, surrounding the shaft carrying the contact-wheels and bearing against the wheels so as to press them with a yielding pressure against their respective conductors, as shown in Fig. 1.

As an additional means of bracing, the conduit may be provided with longitudinal braces 28, the ends of which are secured to transverse braces 20 and extend to the crown or under side of the upper sections, as shown in Fig. 2. The conduit will of course be provided with the usual brace-rods 29, extending to the track-stringers 37 in a manner well known, and may likewise be provided with rods 36, extending vertically to a horizontal transverse beam or tie 38, arranged below the conduit.

In order to permit the water that may pass into the conduit through its longitudinal slot to pass out freely, the floor 24 of the conduit may be inclined, as shown in Fig. 2, in opposite directions toward an outlet 27, formed at its lowermost point and having, it may be, suitable connections with a sewer; or the same result may be secured by providing the outlet 27 at the foot of the gradient slopes along the extent of the conduit. By the same means the interior of the conduit may be cleaned and the accumulated dirt similarly removed through said outlet 27. For the purpose of ready access to the interior of the conduit, one or both of the upper sections $ab$ may be provided with a man or arm hole 30, by means of which the conduit may be cleaned or repaired or the cable or electric devices contained thereby inspected and repaired.

The space B behind the transverse braces 20 may be utilized for the accommodation of electrical conductors C—as, for instance, electric telegraph or light wires, the braces 20 serving as a convenient means of supporting them; and instead of inclosing said conductors in the form of a cable, as in Fig. 1, the inner sides of the braces may be provided with a series of ears or staples in which the conductors may be supported or to which they may be connected, as shown in Fig. 3. In order to permit one or more of the conductors to be led from the interior of the conduit, the latter is provided at suitable intervals along its length with openings 33, as shown in Figs. 1 and 2.

By supporting the insulator-strip 21 so that it may have free longitudinal movement with respect to its supports, the conduit permits the conductor carried thereby to be a unit, thus greatly increasing its conductivity in dispensing with all devices for accommodating expansion and contraction.

What I claim is—

1. The combination of a conduit, inclined transverse braces, an inclined longitudinal strip supported by said braces, a conductor secured to said strip, and a beveled contact wheel or brush, substantially as described.

2. The combination of a conduit composed of detachable sections in cross-section, transverse braces for sustaining the upper sections, a longitudinally-extending insulator-strip, and connections between the strip and the braces to permit the strip to move longitudinally with respect thereto, substantially as described.

In testimony whereof I have signed my name to this specification in the presence of two subscribing witnesses.

WILLIAM JOHN BREWER.

Witnesses:
WALTER PERRY JOHNSON,
LOUIS S. PHILLIPS.